No. 843,298. PATENTED FEB. 5, 1907.
G. C. PYLE.
LAMP APPARATUS FOR VEHICLES.
APPLICATION FILED JUNE 7, 1906.

George C. Pyle.

UNITED STATES PATENT OFFICE.

GEORGE C. PYLE, OF INDIANAPOLIS, INDIANA.

LAMP APPARATUS FOR VEHICLES.

No. 843,298.　　　Specification of Letters Patent.　　　Patented Feb. 5, 1907.

Application filed June 7, 1906. Serial No. 320,536.

*To all whom it may concern:*

Be it known that I, GEORGE C. PYLE, of Indianapolis, county of Marion, and State of Indiana, have invented a certain new and useful Lamp Apparatus for Vehicles; and I do hereby declare that the following is a full, clear, and exact description thereof, reference being had to the accompanying drawings, in which like numerals refer to like parts.

The object of this invention is to provide a balanced-lamp construction and with a readily removable lamp-bracket. The lamp is carried immediately by a pivoted yoke-shaped frame and away from the pivotal point, so that the lamp is substantially balanced by said pivoted frame. This pivoted yoke-like frame is mounted on a stationary yoke-like support. Means are provided for clamping the pivoted lamp-holding frame on said support, but in a balanced position, so that if said clamping means becomes loosened by the jar of the automobile the lamp will still be maintained in its horizontal position by the counter effect of the pivotal portion of the frame. Heretofore in the constructions of which I am aware the lamp turns from a horizontal to a vertical position when the means that carries it becomes loosened by the jar of the machine. This and the other features of the invention will be more fully understood from the accompanying drawings and the following description and claims.

Figure 1:
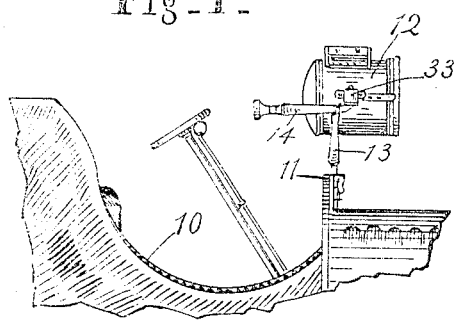
Figure 2:
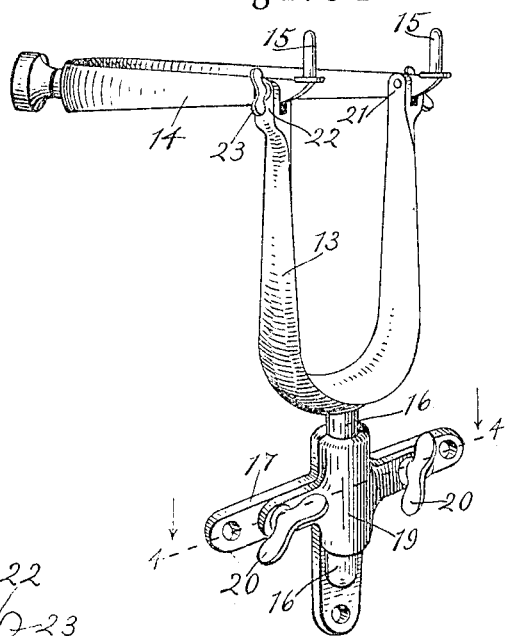
Figure 3:
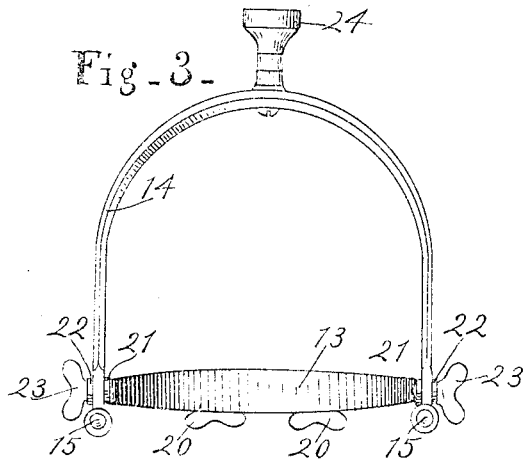
Figure 4:
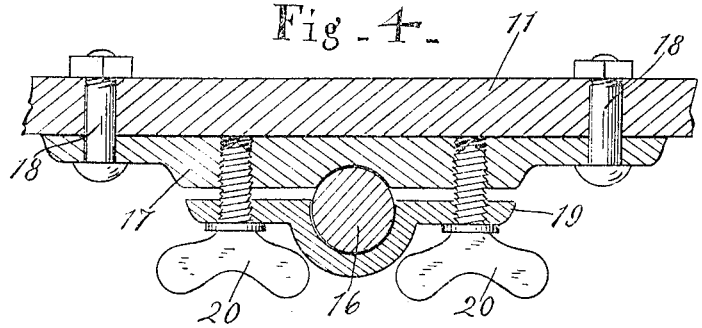

In the drawings, Figure 1 is a side elevation of the forward portion of an automobile with a lamp in place, the remainder of the automobile being broken away. Fig. 2 is a perspective view of a total means for carrying the lamp. Fig. 3 is a plan view of the same. Fig. 4 is a section on the line 4 4 of Fig. 2.

The lamp-supporting means or bracket is secured to the dashboard 11 of the automobile 10. The lamp 12 may be in any usual form, that shown having on each side an ear 33, adapted to slip down over pins on the supporting-bracket.

This invention does not relate to the automobile or lamp, for it may be used in connection with any usual style of automobile or lamp.

I make a yoke-shaped stationary support 13 for carrying a pivotal frame 14, having on it vertical pins 15, that project through the ears 33 of the lamp when it is in place. The support 13 has a central downwardly-extending rod 16, that is clamped between the plates 17, that is secured to the bar 11 by the bolts 18 and the clamping-plate 19, that is clamped in place by the set-screws 20. This means for mounting the lamp-bracket enables it to be removed during daylight use of the automobile by merely loosening the screws 20 and readily insertible for use at night.

Each arm of the stationary support 13 at its upper end is divided into two parts 21 and 22, like a split ear spaced apart for pivoting the side arm or portion of the pivotal frame 14. The pivot is a screw 23, that when tightened draws the ears 21 and 22 toward each other and clamps the arm of the pivotal frame 14 between them. At the inner end of the frame 14 there is a hand-knob 24.

It is observed that the great weight and bulk of the frame 14 is at one side of the pivotal points thereof and that the pins 15 for the lamp are on the other side of the pivotal points, but near thereto, so that the lamp when in place will be counterbalanced by the pivotal frame 14 and said frame and lamp be maintained in substantially a horizontal position by brackets. Normally the screws 23 are tightened, so as to clamp said frame 14 in a horizontal position; but in case said screws should become loosened by the jar of the automobile said frame 14 will continue to hold the lamp in a substantially horizontal position instead of turning skyward like the constructions of the kind heretofore in use.

What I claim as my invention, and desire to secure by Letters Patent, is—

1. The combination of a lamp, a lamp-bracket for vehicles consisting of a vertically-extending yoke-shaped member mounted on the vehicle, a horizontally-disposed yoke-shaped member with the arms thereof pivoted between their ends on the arms of said vertically-disposed member, and means for clamping said two members together, said lamp being mounted on the ends of the arms of said horizontal member in position to substantially balance the other end of said member.

2. A lamp-bracket for vehicles consisting of a vertically-disposed horizontally-oscillatory yoke-shaped member with its two sides extending upward; a yoke-shaped horizontally-disposed vertically-oscillatory member with its sides pivoted in the upper part of the other member and with relatively short ends to one side of the pivotal point, and upwardly-extending pins on the short portions of said horizontal member for holding a lamp, substantially as set forth.

3. A lamp-bracket for vehicles consisting of a yoke-shaped vertically-disposed member with its sides extending upward and provided at their upper ends with pairs of parallel ears, a horizontal yoke-shaped member with the sides pivoted between said ears at points slightly removed from the extreme ends of said horizontal member so there will be short portions of said member to one side of the pivotal points, clamp-screws extending through said ears and horizontal member for pivoting and clamping the same together, and upwardly-extending pins on the short portions of said horizontal member for holding a lamp.

In witness whereof I have hereunto affixed my signature in the presence of the witnesses herein named.

GEORGE C. PYLE.

Witnesses:
N. ALLEMONG,
HELEN B. McCORD.